(12) United States Patent
Davis

(10) Patent No.: US 7,694,626 B2
(45) Date of Patent: Apr. 13, 2010

(54) APPARATUS AND METHOD TO IMPART SMOKE FLAVORING TO BARBEQUED MEAT

(76) Inventor: Brant S. Davis, 19333 N. Buck Rd., Acampo, CA (US) 95220

( * ) Notice: Subject to any disclaimer, the term of this patent is extended or adjusted under 35 U.S.C. 154(b) by 642 days.

(21) Appl. No.: 11/546,878

(22) Filed: Oct. 11, 2006

(65) Prior Publication Data

US 2007/0256572 A1 Nov. 8, 2007

Related U.S. Application Data

(60) Provisional application No. 60/797,418, filed on May 3, 2006.

(51) Int. Cl.
*A23B 4/03* (2006.01)
(52) U.S. Cl. ........................................................ 99/482
(58) Field of Classification Search ........... 99/467–482; 43/125, 126, 127, 128, 129, 130; 126/59.5; 422/305
See application file for complete search history.

(56) References Cited

U.S. PATENT DOCUMENTS

| | | | | |
|---|---|---|---|---|
| 4,869,163 A | * | 9/1989 | Haskins | 99/482 |
| 6,903,310 B1 | * | 6/2005 | Lee et al. | 219/490 |
| 2004/0208969 A1 | * | 10/2004 | Holzschuh et al. | 426/534 |
| 2006/0011192 A1 | * | 1/2006 | Citrynell et al. | 126/25 R |

* cited by examiner

*Primary Examiner*—Daniel L Robinson
(74) *Attorney, Agent, or Firm*—R. Michael West

(57) ABSTRACT

A fire-proof smoke canister is loaded with a fragrant burnable mixture, comprising wood chips, shavings, or sawdust, combined with one or more selected herb seasonings such as oregano, fennel, dill, sage, ginger, rosemary, thyme, or celery seed. The burnable mixture may itself be a combination of various woods, including vintage oak obtained from retired wine barrels. At least one aperture is provided in the wall of the canister, preferably in the removable cover portion. The loaded canister is placed on a charcoal, gas, or electric fired barbeque grill for heating. Once smoke exudes from the aperture, the meat is placed on the grill and a cover is lowered over the grill to confine the smoke. The aperture size is selected as to allow only slow, oxygen-starved combustion of the burnable mixture within the canister. The canister may be re-loaded repeatedly with new burnable mixture for successive barbeques.

3 Claims, 1 Drawing Sheet

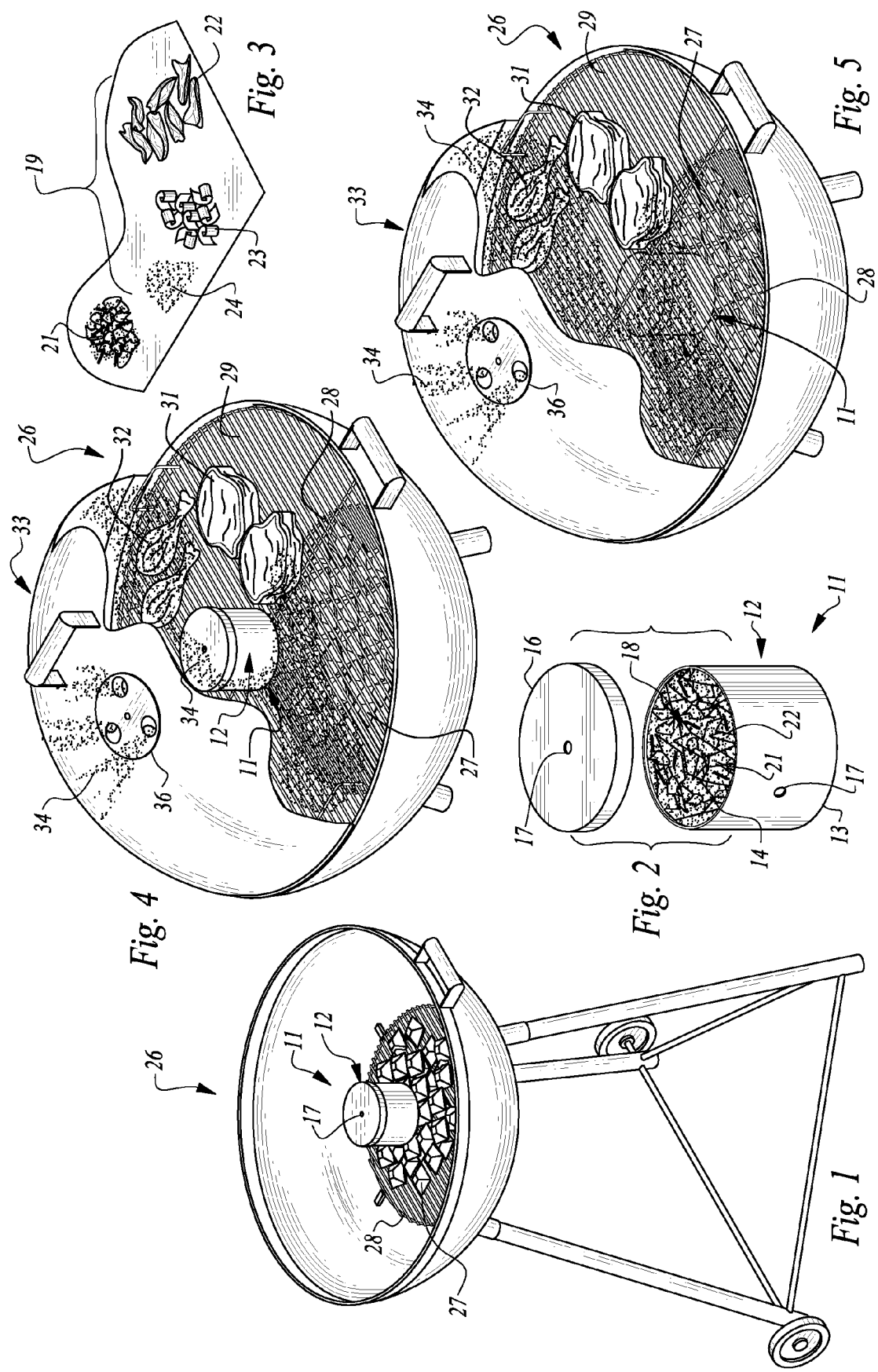

APPARATUS AND METHOD TO IMPART SMOKE FLAVORING TO BARBEQUED MEAT

PRIORITY CLAIM

Pursuant to the provisions of 35 U.S.C. §119(e)(1), Applicant claims the priority of U.S. Provisional Patent Application Ser. No. 60/797,418, filed May 3, 2006.

BACKGROUND OF THE INVENTION

1. Field of the Invention

The invention relates generally to apparatus and methods used to impart a unique blend of wood smoke and seasoning flavors to meat being barbequed. More particularly, the invention pertains to a substantially sealed metal canister refillable with a mixture of burnable wood particles and herbs, which generates a flavorful smokey environment within a covered barbeque.

2. Description of the Prior Art

The natural process of cooking meat over fire creates flavorful smoke as meat juices and fat drippings fall on burning coal or other sources of heat for the barbeque. If the volume immediately over the barbeque grill is at least partially enclosed, such as through the use of a kettle cover or a shroud, the effectiveness of the smoking process will be increased. The barbeque cover confines and concentrates the smoke, and conserves heat generated by the source of heat. In such an arrangement, an adjustable vent in the barbeque cover allows sufficient oxygen to pass through the barbeque to maintain the fire.

To enhance the barbeque flavor further, it has been advocated to pre-soak chips or pieces of aromatic wood in water for a period of time, so that water is absorbed by the wood. Then the wet pieces of wood are spread over the coals or the fire, just before barbequing the meat. The pre-soaked wood chips or pieces tend to smoke or smolder for a period of time, as the water is driven off by the heat from the fire. This smoke imparts an oak, mesquite, or hickory flavor to the barbequed meat that it would not otherwise have.

Another approach to increasing barbeque smoke flavor entails the use of a sealed, metal canister containing pellets. The pellets are manufactured from ground pieces of hickory wood formed and held together through the use of a binder. This canister may be placed either directly on the coals located in the bottom of the barbeque, or on top of the grill adjacent the meat to be cooked. A small hole in the top of the canister allows a limited amount of oxygen to enter the canister to support smoldering or slow burning of the hickory pellets. The hole also allows the resultant smoke to exit the canister, and fill the interior of the barbeque housing with smoke. A currently available product, using such components is sold under the trademark FLAVORWOOD. This product is sold by Bar-B-Q Woods, Inc., of Newton, Kans.

SUMMARY OF THE INVENTION

The apparatus of the present invention comprises a fire-resistant smoke canister filled with a burnable mixture. The canister includes a body with an open top. The canister also includes a detachable lid sized and configured to cover the open top. A small aperture is provided in a wall of the canister, preferably in the lid.

The burnable mixture comprises at least one wood product and at least one herb seasoning. The wood product is selected from one or more of the following woods: hickory, mesquite, alder, applewood, oak, maple, cedar, sassafras, walnut, cherry, grape, pear, or almond. The wood product is entirely natural, being manufactured from wood chips, wood shavings, or sawdust. The herb seasoning is selected from one or more of the following natural seasonings: oregano, fennel, dill, sage, ginger, rosemary, thyme, or celery seed.

The canister is loaded with a quantity of the burnable mixture, and the lid is placed over the open top of the canister. The loaded canister is placed within the barbeque where meat is to be cooked. The canister may be placed directly on the source of heat in a gas, charcoal, or electric barbeque. Alternatively, the canister may be placed in spaced relation from the source of heat, such as on the meat cooking grill.

The burnable mixture smolders in the oxygen-starved environment of the canister, exuding smoke through the aperture. The aperture is sized only to allow smoldering of the burnable mixture. Once smoke emits from the canister, the meat is placed on the cooking grill and the barbeque is covered. The smokey flavors from the burnable mixture are imparted to the barbequed meat.

Owing to its fire-proof body and removable lid, the canister may be re-loaded repeatedly with new burnable mixture for successive barbeques.

BRIEF DESCRIPTION OF THE DRAWINGS

FIG. 1 is a perspective view of a barbeque with the cover removed to show the canister of the present invention place directly upon coals;

FIG. 2 is an exploded perspective view, showing the detachable lid and the body filled with a burnable mixture;

FIG. 3 is a perspective view of piles of wood chips, wood shavings, sawdust, and herbs which are variously combined to formulate the burnable mixture;

FIG. 4 is a perspective view of a barbeque, with the cover being partially cut-away to show the canister on the upper cooking grill and imparting smoke to the meat pieces on the grill; and, FIG. 5 is a perspective view as in FIG. 4, but with the canister placed directly on the coals for heating.

DETAILED DESCRIPTION OF THE PREFERRED EMBODIMENT

Making particular reference to FIG. 2, the apparatus 11 of the present invention includes a fire-proof smoke canister 12, preferably right-circular cylindrical in configuration for ease of manufacture and handling during use. However, canister 12 can be square, rectangular, triangular, oval, or any other desired geometric shape in plan. Canister 12 may be manufactured from silver tin, or any other fire-proof material capable of withstanding temperatures encountered in the flames of a wood, charcoal, gas, or electric barbeque.

Canister 12 is comprised of two components, a body 13 with an open top 14, and a detachable lid 16. As will be explained further below, lid 16 is removed for loading canister 12, and is lowered over open top 14 of body 13, during use of the apparatus 11. Lid 16 includes at least one aperture 17, allowing gases to pass into and out from canister 16. It should be noted that more than one aperture 17 may be provided in lid 16, and that aperture 17 may be located elsewhere in canister 12, for example, in the sidewall of body 13.

Apparatus 11 also includes a burnable mixture 18 comprising two components, at least one natural wood product 19 and at least one herb seasoning 21. Wood product 19 may be in the form of wood chips 22, wood shavings 23, or sawdust 24, as shown in FIG. 3. By way of example only, wood chips 22 may range from a fine to a coarse ground consistency, having an average dimension of say, 1/16" across. Irrespective of its form, wood product 19 is a natural wood product, and does not include binders or other non-natural elements or additives.

Wood product 19 is preferably made from a hardwood, for example, hickory, mesquite, alder, applewood, oak, maple, cedar, sassafras, walnut, cherry, grape, pear, or almond. One particularly desirable type of wood product 19 is comprised of wood chips 22 or wood shavings 23 resulting from the rejuvenation of an alcoholic beverage fermentation barrel. Both French and American oak are commonly used to make barrels for alcoholic beverage fermentation and aging. Such beverages may include whiskey, wine, bourbon, or brandy.

Oak used to make fermentation and aging barrels particularly for wine is known in the industry as Vintage Oak. After Vintage Oak barrels have been used for a period of time, they are periodically renewed, by shaving or scraping off wood material on the inner sides of the barrel. This exposes underlying fresh wood, allowing the barrel to be put back into service. However, the Vintage Oak wood shavings, scraping, or chips which are removed from the barrel are put to advantageous use herein by using such material as the wood product 19, either by itself, or in combination with one or more other wood products 19. The Vintage Oak shavings are imbued with the flavor and fragrance of the beverage which was contained within the barrel, imparting unique flavors and fragrances to meat barbequed in conjunction with the apparatus 11.

The herb seasoning 21 employed herein is also a natural product, determined by the selections and combinations desired for meat flavoring. Herb seasoning 21 may be selected from one or more of the popular seasonings such as oregano, fennel, dill, sage, ginger, rosemary, thyme, or celery seed, although this list is not intended to be limiting or all inclusive. Generally, any natural herb used in seasoning foods would be appropriate for seasoning 21. In formulating the burnable mixture 18, one or more herb seasonings 21 is blended with the wood product 19, with the seasoning being within the range of approximately 1% to 5% by weight, of the total burnable mixture. It is preferable that the seasoning be approximately 3% by weight of the total mixture, although this percentage is not critical in any way.

The following table demonstrates examples of burnable mixture, showing different combinations of wood product 19 and herb seasoning 21 that may be used in practicing the invention herein.

EXAMPLES

| WOOD PRODUCT COMPONENT | HERB SEASONING COMPONENT |
|---|---|
| 1. Mesquite and Vintage Oak | Thyme and Fennel |
| 2. Hickory and Vintage Oak | Oregano and Celery Seed |
| 3. Apple and Vintage Oak | Sage and Ginger |
| 4. Alder and Vintage Oak | Rosemary and Dill |

As shown in FIG. 2, the burnable mixture 18 is poured into the body 13 until it reaches close to the open top 14. In further preparation, the lid 16 is installed over the open top, ensuring that canister 12 is substantially sealed, with the exception of aperture 17. The filled canister 12 is then placed into a pre-fired barbeque 26, having charcoal coals 27 already burning on the lower grill 28. The canister 12 may be placed directly onto the charcoal coals 27, as shown in FIG. 1. If a gas or electric barbeque is employed, the same approach may be used, namely, placing the canister 12 directly upon the source of heat.

The user waits until smoke begins to emit from the aperture 17, signaling that the burnable mixture 18 is smoldering. The size of aperture 17 is selected to allow only a relatively small amount of oxygen to enter the canister, so the burnable mixture 18 cannot flame. Thus, only oxygen-starved combustion occurs within canister 12, providing a continuous discharge of smoke through the aperture 17. Next, the upper cooking grill 29 is installed within the barbeque 26, as shown in FIG. 5. Meat pieces 31 and 32 are then placed on the cooking grill 29, and the kettle cover 33 is lowered over the open top of the barbeque.

The smoke 34 produced by the smoking canister 12, fills the contained volume within the barbeque 26, imparting smoky, herbal flavors to the meat pieces 31 and 32. An adjustable vent 36 in the cover 33, controls the fire and allows a certain amount of heat and smoke 34 to discharge into the atmosphere.

The canister 12 may also be utilized by placing it on the upper cooking grill 29, as shown in FIG. 4. Using this method, the barbeque is fired as previously explained, and the cooking grill 29 is then installed in the usual way. Because the canister 12 is now in spaced relation from the coals 27, it may take a few more minutes for the canister to begin smoking. However, as the heat builds, the burnable mixture 18 will begin to smolder, letting the user know that it is time to place the meat pieces 31 and 32 onto the cooking grill 29. The kettle cover 33 and vent 36 are used as described previously. Heating canister 12 in this indirect way will likely result in a slower burn of the contained burnable mixture 18. This approach would typically be useful for cooking larger pieces of meat or for cooking multiple batches of meat.

After the barbeque is over and all components thereof have reached ambient temperature, the lid 16 to the canister 12 is removed. Depending upon the condition of the burnable mixture 18, it may either be discarded or supplemented with new burnable mixture. In this manner, the apparatus 11 of the present invention may be reused repeatedly, and recharged with the same or a different selection of burnable mixture 18 for the next barbeque.

What is claimed is:

1. An apparatus for imparting smoke flavoring the barbequed meat comprising:
   a. a smoke canister, said canister having a body with an open top and a detachable lid covering said open top, said lid being provided with an aperture therein; and,
   b. a burnable mixture comprising shavings removed from an inner wall of a wood barrel previously used in the fermentation of an alcoholic beverage, and at least one herb seasoning, said burnable mixture being contained within said canister body with said lid thereon, whereby when heat is applied to said canister said mixture burns in an oxygen-starved environment causing smoke to exude through said aperture.

2. An apparatus as in claim 1 in which said wood barrel comprises French oak, American oak, red oak, or white oak.

3. An apparatus as in claim 1 in which said herb seasoning comprises oregano, fennel, dill, sage, ginger, rosemary, thyme, or celery seed.

* * * * *

UNITED STATES PATENT AND TRADEMARK OFFICE
CERTIFICATE OF CORRECTION

| | | |
|---|---|---|
| PATENT NO. | : 7,694,626 B2 | |
| APPLICATION NO. | : 11/546878 | |
| DATED | : April 13, 2010 | |
| INVENTOR(S) | : Davis | |

It is certified that error appears in the above-identified patent and that said Letters Patent is hereby corrected as shown below:

Please delete patent 7,694,626 in its entirety and insert patent 7,694,626 in its entirety as attached Signed and Sealed this
Twenty-seventh Day of March, 2012

David J. Kappos
*Director of the United States Patent and Trademark Office*

(12) United States Patent
Davis

(10) Patent No.: US 7,694,626 B2
(45) Date of Patent: Apr. 13, 2010

(54) APPARATUS AND METHOD TO IMPART SMOKE FLAVORING TO BARBEQUED MEAT

(76) Inventor: Brant S. Davis, 19333 N. Buck Rd., Acampo, CA (US) 95220

(*) Notice: Subject to any disclaimer, the term of this patent is extended or adjusted under 35 U.S.C. 154(b) by 642 days.

(21) Appl. No.: 11/546,878

(22) Filed: Oct. 11, 2006

(65) Prior Publication Data
US 2007/0256572 A1 Nov. 8, 2007

Related U.S. Application Data

(60) Provisional application No. 60/797,418, filed on May 3, 2006.

(51) Int. Cl.
*A23B 4/03* (2006.01)
(52) U.S. Cl. .................................................. 99/482
(58) Field of Classification Search .......... 99/467–482; 43/125, 126, 127, 128, 129, 130; 126/59.5; 422/305
See application file for complete search history.

(56) References Cited

U.S. PATENT DOCUMENTS

| 4,869,163 A * | 9/1989 | Haskins ................... 99/482 |
| 6,903,310 B1 * | 6/2005 | Lee et al. ................. 219/490 |
| 2004/0208969 A1 * | 10/2004 | Holzschuh et al. ........ 426/534 |
| 2006/0011192 A1 * | 1/2006 | Citrynell et al. ......... 126/25 R |

* cited by examiner

*Primary Examiner* — Daniel L Robinson
(74) *Attorney, Agent, or Firm* — R. Michael West

(57) ABSTRACT

A fire-proof smoke canister is loaded with a fragrant burnable mixture, comprising wood chips, shavings, or sawdust, combined with one or more selected herb seasonings such as oregano, fennel, dill, sage, ginger, rosemary, thyme, or celery seed. The burnable mixture may itself be a combination of various woods, including vintage oak obtained from retired wine barrels. At least one aperture is provided in the wall of the canister, preferably in the removable cover portion. The loaded canister is placed on a charcoal, gas, or electric fired barbeque grill for heating. Once smoke exudes from the aperture, the meat is placed on the grill and a cover is lowered over the grill to confine the smoke. The aperture size is selected as to allow only slow, oxygen-starved combustion of the burnable mixture within the canister. The canister may be re-loaded repeatedly with new burnable mixture for successive barbeques.

12 Claims, 1 Drawing Sheet

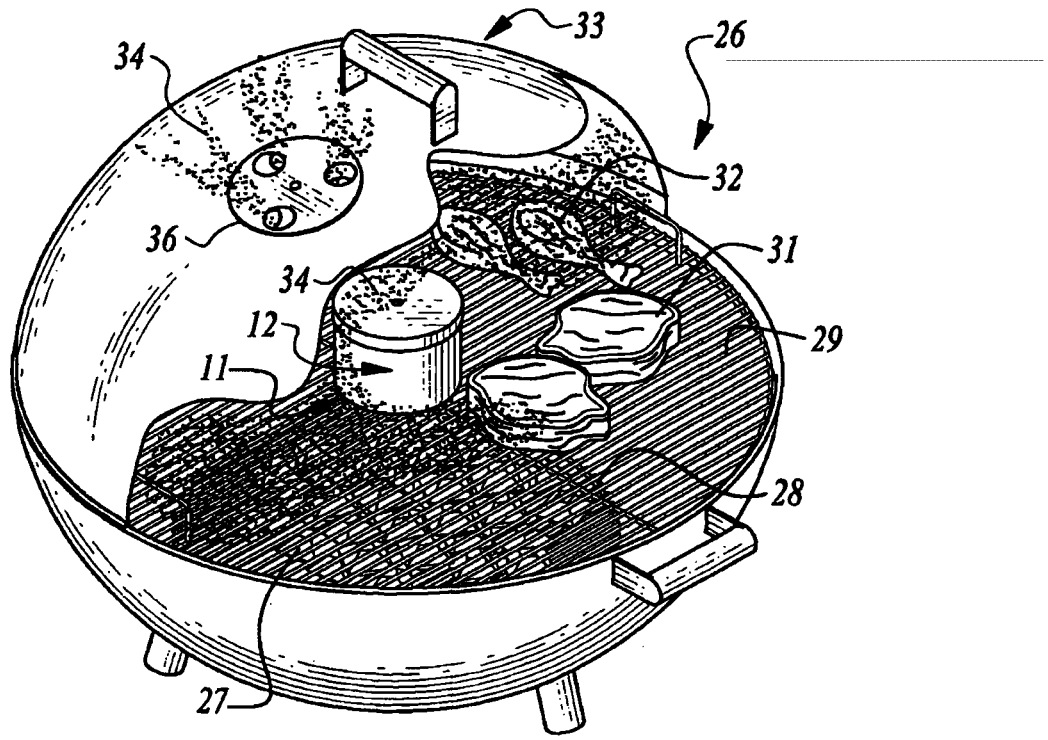

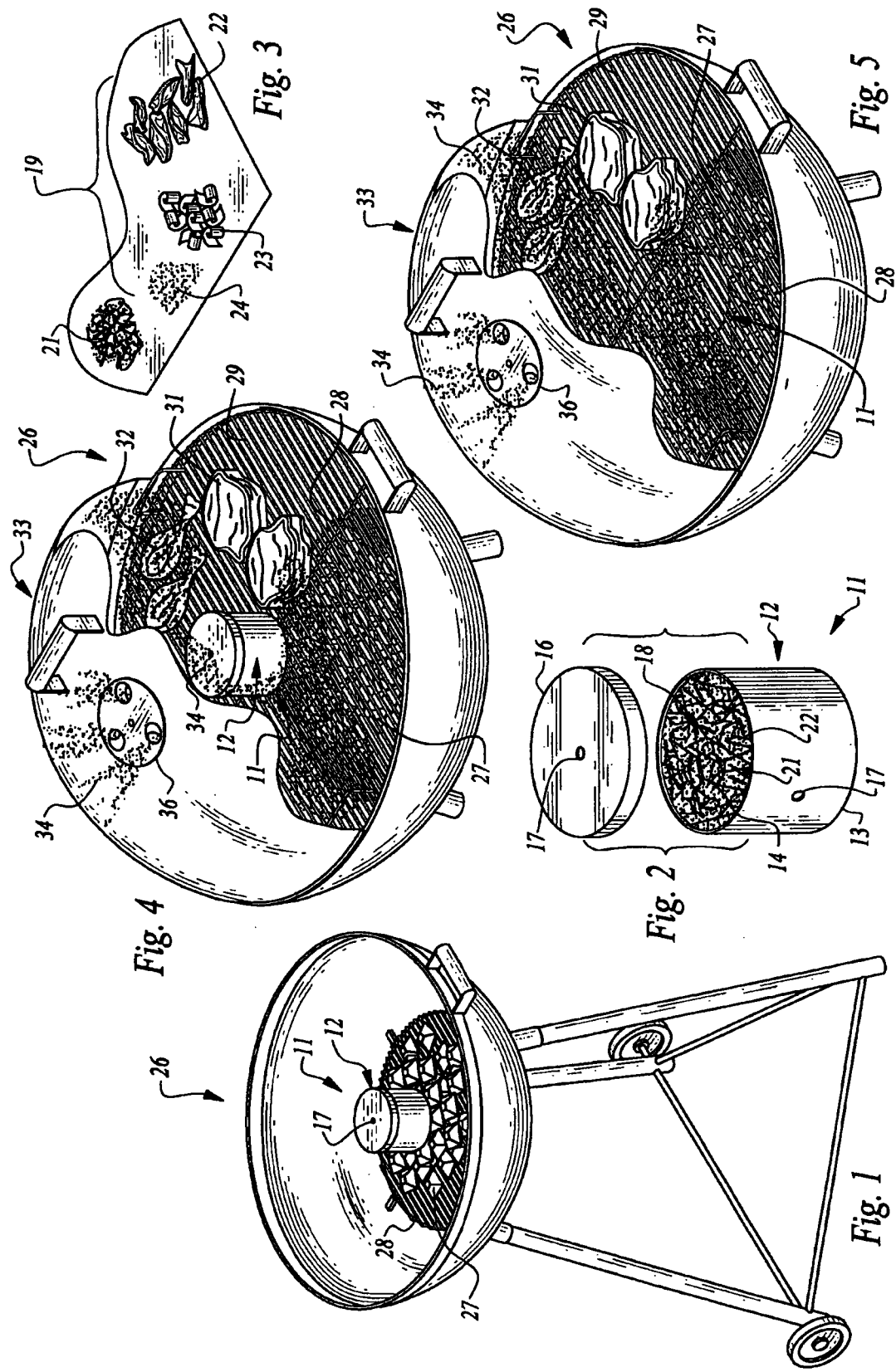

US 7,694,626 B2

APPARATUS AND METHOD TO IMPART SMOKE FLAVORING TO BARBEQUED MEAT

PRIORITY CLAIM

Pursuant to the provisions of 35 U.S.C. §119(e)(1), Applicant claims the priority of U.S. Provisional Patent Application Ser. No. 60/797,418, filed May 3, 2006.

BACKGROUND OF THE INVENTION

1. Field of the Invention

The invention relates generally to apparatus and methods used to impart a unique blend of wood smoke and seasoning flavors to meat being barbequed. More particularly, the invention pertains to a substantially sealed metal canister refillable with a mixture of burnable wood particles and herbs, which generates a flavorful smokey environment within a covered barbeque.

2. Description of the Prior Art

The natural process of cooking meat over fire creates flavorful smoke as meat juices and fat drippings fall on burning coal or other sources of heat for the barbeque. If the volume immediately over the barbeque grill is at least partially enclosed, such as through the use of a kettle cover or a shroud, the effectiveness of the smoking process will be increased. The barbeque cover confines and concentrates the smoke, and conserves heat generated by the source of heat. In such an arrangement, an adjustable vent in the barbeque cover allows sufficient oxygen to pass through the barbeque to maintain the fire.

To enhance the barbeque flavor further, it has been advocated to pre-soak chips or pieces of aromatic wood in water for a period of time, so that water is absorbed by the wood. Then the wet pieces of wood are spread over the coals or the fire, just before barbequing the meat. The pre-soaked wood chips or pieces tend to smoke or smolder for a period of time, as the water is driven off by the heat from the fire. This smoke imparts an oak, mesquite, or hickory flavor to the barbequed meat that it would not otherwise have.

Another approach to increasing barbeque smoke flavor entails the use of a sealed, metal canister containing pellets. The pellets are manufactured from ground pieces of hickory wood formed and held together through the use of a binder. This canister may be placed either directly on the coals located in the bottom of the barbeque, or on top of the grill adjacent the meat to be cooked. A small hole in the top of the canister allows a limited amount of oxygen to enter the canister to support smoldering or slow burning of the hickory pellets. The hole also allows the resultant smoke to exit the canister, and fill the interior of the barbeque housing with smoke. A currently available product, using such components is sold under the trademark FLAVORWOOD. This product is sold by Bar-B-Q Woods, Inc., of Newton, Kans.

SUMMARY OF THE INVENTION

The apparatus of the present invention comprises a fire-resistant smoke canister filled with a burnable mixture. The canister includes a body with an open top. The canister also includes a detachable lid sized and configured to cover the open top. A small aperture is provided in a wall of the canister, preferably in the lid.

The burnable mixture comprises at least one wood product and at least one herb seasoning. The wood product is selected from one or more of the following woods: hickory, mesquite, alder, applewood, oak, maple, cedar, sassafras, walnut, cherry, grape, pear, or almond. The wood product is entirely natural, being manufactured from wood chips, wood shavings, or sawdust. The herb seasoning is selected from one or more of the following natural seasonings: oregano, fennel, dill, sage, ginger, rosemary, thyme, or celery seed.

The canister is loaded with a quantity of the burnable mixture, and the lid is placed over the open top of the canister. The loaded canister is placed within the barbeque where meat is to be cooked. The canister may be placed directly on the source of heat in a gas, charcoal, or electric barbeque. Alternatively, the canister may be placed in spaced relation from the source of heat, such as on the meat cooking grill.

The burnable mixture smolders in the oxygen-starved environment of the canister, exuding smoke through the aperture. The aperture is sized only to allow smoldering of the burnable mixture. Once smoke emits from the canister, the meat is placed on the cooking grill and the barbeque is covered. The smokey flavors from the burnable mixture are imparted to the barbequed meat.

Owing to its fire-proof body and removable lid, the canister may be re-loaded repeatedly with new burnable mixture for successive barbeques.

BRIEF DESCRIPTION OF THE DRAWINGS

FIG. 1 is a perspective view of a barbeque with the cover removed to show the canister of the present invention place directly upon coals;

FIG. 2 is an exploded perspective view, showing the detachable lid and the body filled with a burnable mixture;

FIG. 3 is a perspective view of piles of wood chips, wood shavings, sawdust, and herbs which are variously combined to formulate the burnable mixture;

FIG. 4 is a perspective view of a barbeque, with the cover being partially cut-away to show the canister on the upper cooking grill and imparting smoke to the meat pieces on the grill; and, FIG. 5 is a perspective view as in FIG. 4, but with the canister placed directly on the coals for heating.

DETAILED DESCRIPTION OF THE PREFERRED EMBODIMENT

Making particular reference to FIG. 2, the apparatus 11 of the present invention includes a fire-proof smoke canister 12, preferably right-circular cylindrical in configuration for ease of manufacture and handling during use. However, canister 12 can be square, rectangular, triangular, oval, or any other desired geometric shape in plan. Canister 12 may be manufactured from silver tin, or any other fire-proof material capable of withstanding temperatures encountered in the flames of a wood, charcoal, gas, or electric barbeque.

Canister 12 is comprised of two components, a body 13 with an open top 14, and a detachable lid 16. As will be explained further below, lid 16 is removed for loading canister 12, and is lowered over open top 14 of body 13, during use of the apparatus 11. Lid 16 includes at least one aperture 17, allowing gases to pass into and out from canister 16. It should be noted that more than one aperture 17 may be provided in lid 16, and that aperture 17 may be located elsewhere in canister 12, for example, in the sidewall of body 13.

Apparatus 11 also includes a burnable mixture 18 comprising two components, at least one natural wood product 19 and at least one herb seasoning 21. Wood product 19 may be in the form of wood chips 22, wood shavings 23, or sawdust 24, as shown in FIG. 3. By way of example only, wood chips 22 may range from a fine to a coarse ground consistency, having an average dimension of say, 1/16" across. Irrespective of its form, wood product 19 is a natural wood product, and does not include binders or other non-natural elements or additives.

Wood product 19 is preferably made from a hardwood, for example, hickory, mesquite, alder, applewood, oak, maple, cedar, sassafras, walnut, cherry, grape, pear, or almond. One particularly desirable type of wood product 19 is comprised of wood chips 22 or wood shavings 23 resulting from the rejuvenation of an alcoholic beverage fermentation barrel. Both French and American oak are commonly used to make barrels for alcoholic beverage fermentation and aging. Such beverages may include whiskey, wine, bourbon, or brandy.

Oak used to make fermentation and aging barrels particularly for wine is known in the industry as Vintage Oak. After Vintage Oak barrels have been used for a period of time, they are periodically renewed, by shaving or scraping off wood material on the inner sides of the barrel. This exposes underlying fresh wood, allowing the barrel to be put back into service. However, the Vintage Oak wood shavings, scraping, or chips which are removed from the barrel are put to advantageous use herein by using such material as the wood product 19, either by itself, or in combination with one or more other wood products 19. The Vintage Oak shavings are imbued with the flavor and fragrance of the beverage which was contained within the barrel, imparting unique flavors and fragrances to meat barbequed in conjunction with the apparatus 11.

The herb seasoning 21 employed herein is also a natural product, determined by the selections and combinations desired for meat flavoring. Herb seasoning 21 may be selected from one or more of the popular seasonings such as oregano, fennel, dill, sage, ginger, rosemary, thyme, or celery seed, although this list is not intended to be limiting or all inclusive. Generally, any natural herb used in seasoning foods would be appropriate for seasoning 21. In formulating the burnable mixture 18, one or more herb seasonings 21 is blended with the wood product 19, with the seasoning being within the range of approximately 1% to 5% by weight, of the total burnable mixture. It is preferable that the seasoning be approximately 3% by weight of the total mixture, although this percentage is not critical in any way.

The following table demonstrates examples of burnable mixture, showing different combinations of wood product 19 and herb seasoning 21 that may be used in practicing the invention herein.

EXAMPLES

| WOOD PRODUCT COMPONENT | HERB SEASONING COMPONENT |
|---|---|
| 1. Mesquite and Vintage Oak | Thyme and Fennel |
| 2. Hickory and Vintage Oak | Oregano and Celery Seed |
| 3. Apple and Vintage Oak | Sage and Ginger |
| 4. Alder and Vintage Oak | Rosemary and Dill |

As shown in FIG. 2, the burnable mixture 18 is poured into the body 13 until it reaches close to the open top 14. In further preparation, the lid 16 is installed over the open top, ensuring that canister 12 is substantially sealed, with the exception of aperture 17. The filled canister 12 is then placed into a pre-fired barbeque 26, having charcoal coals 27 already burning on the lower grill 28. The canister 12 may be placed directly onto the charcoal coals 27, as shown in FIG. 1. If a gas or electric barbeque is employed, the same approach may be used, namely, placing the canister 12 directly upon the source of heat.

The user waits until smoke begins to emit from the aperture 17, signaling that the burnable mixture 18 is smoldering. The size of aperture 17 is selected to allow only a relatively small amount of oxygen to enter the canister, so the burnable mixture 18 cannot flame. Thus, only oxygen-starved combustion occurs within canister 12, providing a continuous discharge of smoke through the aperture 17. Next, the upper cooking grill 29 is installed within the barbeque 26, as shown in FIG. 5. Meat pieces 31 and 32 are then placed on the cooking grill 29, and the kettle cover 33 is lowered over the open top of the barbeque.

The smoke 34 produced by the smoking canister 12, fills the contained volume within the barbeque 26, imparting smoky, herbal flavors to the meat pieces 31 and 32. An adjustable vent 36 in the cover 33, controls the fire and allows a certain amount of heat and smoke 34 to discharge into the atmosphere.

The canister 12 may also be utilized by placing it on the upper cooking grill 29, as shown in FIG. 4. Using this method, the barbeque is fired as previously explained, and the cooking grill 29 is then installed in the usual way. Because the canister 12 is now in spaced relation from the coals 27, it may take a few more minutes for the canister to begin smoking. However, as the heat builds, the burnable mixture 18 will begin to smolder, letting the user know that it is time to place the meat pieces 31 and 32 onto the cooking grill 29. The kettle cover 33 and vent 36 are used as described previously. Heating canister 12 in this indirect way will likely result in a slower burn of the contained burnable mixture 18. This approach would typically be useful for cooking larger pieces of meat or for cooking multiple batches of meat.

After the barbeque is over and all components thereof have reached ambient temperature, the lid 16 to the canister 12 is removed. Depending upon the condition of the burnable mixture 18, it may either be discarded or supplemented with new burnable mixture. In this manner, the apparatus 11 of the present invention may be reused repeatedly, and recharged with the same or a different selection of burnable mixture 18 for the next barbeque.

What is claimed is:

1. An apparatus for imparting smoke flavoring the barbequed meat comprising:
   a. fire-proof smoke canister, said canister having a body with an open top and a detachable lid covering said open top, said canister having at least one aperture either in said lid or in a sidewall thereof; and,
   b. a burnable mixture comprising a wood product removed from an inner wall of a wood barrel previously used in the fermentation of an alcoholic beverage and at least one herb seasoning, said burnable mixture being contained within said canister body with said lid thereon, whereby when heat is applied to said canister said mixture burns in an oxygen-starved environment causing smoke to exude through said aperture.

2. An apparatus as in claim 1 in which said wood product comprises hickory, mesquite, alder, applewood, oak, maple, cedar, sassafras, walnut, cherry, grape, pear, or almond.

3. An apparatus as in claim 1 in which said wood product is manufactured from wood chips or wood shavings from an alcoholic beverage fermentation barrel.

4. An apparatus as in claim 1 in which said alcoholic beverage comprises whiskey, wine, bourbon, or brandy.

5. An apparatus as in claim 1 in which said wood barrel comprises French oak, American oak, red oak, or white oak.

6. An apparatus as in claim 1 in which said wood product comprises wood chips, wood shavings, or sawdust.

7. An apparatus as in claim 1 in which said herb seasoning comprises oregano, fennel, dill, sage, ginger, rosemary, thyme, or celery seed.

8. An apparatus as in claim 1 in which said aperture is provided in said lid.

9. An apparatus as in claim 1 in which said canister may be re-loaded repeatedly with new burnable mixture for successive barbeques.

10. An apparatus for imparting smoke flavoring the barbequed meat comprising:
 a. a smoke canister, said canister having a body with an open top and a detachable lid covering said open top, said lid being provided with an aperture therein; and,
 b. a burnable mixture comprising shavings removed from an inner wall of a wood barrel previously used in the fermentation of an alcoholic beverage, and at least one herb seasoning, said burnable mixture being contained within said canister body with said lid thereon, whereby when heat is applied to said canister said mixture burns in an oxygen-starved environment causing smoke to exude through said aperture.

11. An apparatus as in claim 10 in which said wood barrel comprises French oak, American oak, red oak, or white oak.

12. An apparatus as in claim 10 in which said herb seasoning comprises oregano, fennel, dill, sage, ginger, rosemary, thyme, or celery seed.

* * * * *